April 18, 1939.  C. S. CORZINE  2,154,729
AUTOMATIC BRAKING DEVICE
Filed Nov. 1, 1937
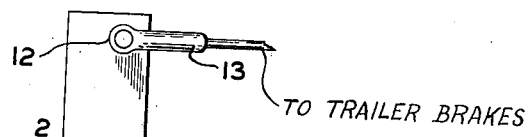
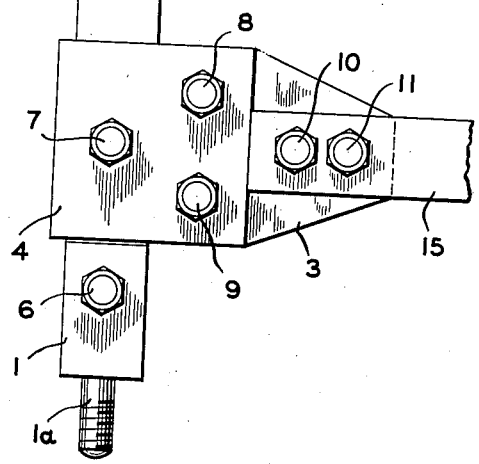
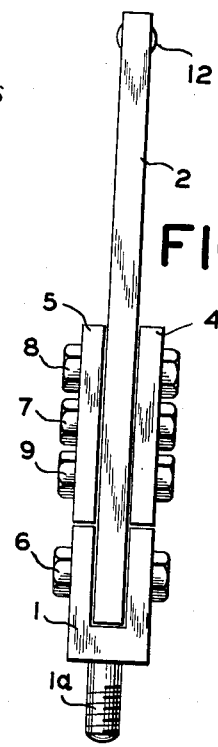
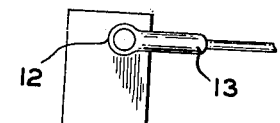
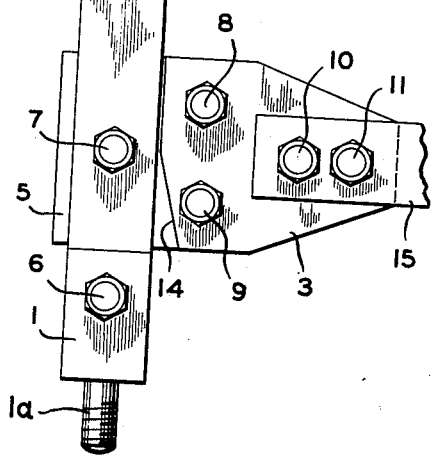
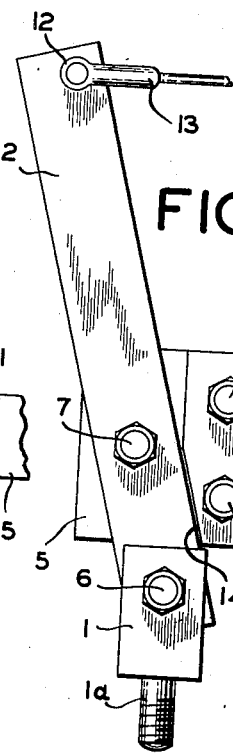
INVENTOR
Chalmers S. Corzine Patented Apr. 18, 1939

2,154,729

UNITED STATES PATENT OFFICE 2,154,729

AUTOMATIC BRAKING DEVICE

Chalmers S. Corzine, Dubuque, Iowa, assignor of one-tenth to John W. Kintzinger, Jr., Dubuque, Iowa Application November 1, 1937, Serial No. 172,203

1 Claim. (Cl. 188—142)

My invention relates to an improvement in the art of automatic braking, when towing one vehicle with another vehicle, either two or four wheel trailers, or for attachment to towing bar used for tandem transportation of new vehicles from factory to dealer, or any other towing operation, where more than one vehicle in tandem is controlled by one operator or driver.

While my invention utilizes an ancient principle; that of leverage; it is a new and novel method of bringing this great force into play in the art of automatic braking. As specifically shown later herein, the more weight applied to my invention relatively that much more power is applied to the brakes on the trailer. However, as soon as the brakes on the car are released and car is accelerated, the brakes on the trailer are automatically released.

I attain these objects by mechanism illustrated in the accompanying drawing, in which—

Figure 1 is a side view of the complete assembly, Figure 2 is a front view of the complete assembly, Figure 3 is a side view of assembly, with side plate 4 removed showing the bevel or pitch 14, of center plate 3, and brake lever 2, in upright position; Figure 4, same as Figure 3, with brake lever 2, in forward or braking position.

Similar numerals refer to similar parts throughout the several views.

Part 1 is a coupling link into the slot of which a brake lever 2, is inserted and pivoted by, bolt, pin, or rivet 6, and is attached to a towing vehicle by turned bolt end 1—a formed on its lower extremity, which is adapted to be inserted through hole in angle bar or other attachment fastened to or made part of towing vehicle.

Part 2 is a pivoting or brake operating lever which is pivoted in slot of part 1 by bolt, pin, or rivet 6, and also pivoting between side plates 4 and 5 on bolt, pin or rivet 7. Hole 12 is provided at top end for connection to a brake rod or cable 13. The swing of this lever is controlled by the pitch or bevel 14, formed on the lower half of front end of center plate 3, which acts as a bumper or stop for brake lever 2.

Part 3 forms a center plate of yoke which is the connecting link between device and tongue or tow bar; such center plate being located between side plates 4 and 5 and immediately behind brake lever 2 and acts as a stop or bumper for brake lever 2; it is attached between side plates 4 and 5 by bolts, pins, or rivets 8 and 9. Pitch or bevel 14 formed on the lower half of front end of center plate 3 determines the swing or pull at the top end of brake lever 2. To the plate 3 is coupled tongue or towing bar by bolts, pins, or rivets 10 and 11.

Parts 4 and 5 are identical plates attached to each side of center plate 3 by bolts, pins, or rivets 8 and 9, to form the yoke member on which is pivoted the brake lever 2 by pivot, bolt, pin, or rivet 7.

15 shows trailer tongue or tow bar (in part) attached to center plate 3 attached by bolts, pins, or rivets 10 and 11.

This device may also be made with ball and socket connections on lower end of brake lever 2 in place of part 1 such ball and socket coupler, I understand, is already patented.

This device is absolutely automatic, as to braking principle, the relative speed of towed and towing vehicles governing same. If the speed of the towing vehicle is reduced to less than that of the towed vehicle, the towed vehicle pushes forward on the tongue or tow bar, attaching it to towing vehicle, and forces brake lever 2, to pivot on 6 and 7, swinging top of brake lever ahead and pulling ahead on brake rod or cable, 13, which on trailer is attached to an equalizer bar, which in turn applies brakes. As soon as the towed vehicle's speed is reduced to that of the towing vehicle it drops back; pulling back on tongue or tow bar, which in turn pulls brake lever, 2, back to the upright position, releasing the brakes.

The same action takes place when descending a hill; as the forward push or surge of the towed vehicle on the tongue or tow bar sets the device in action, and releases it again at the bottom of the descent.

I am aware that prior to my invention other braking devices have been made; and as my invention I claim:

A hitch for automatically operating a trailer brake mechanism comprising in combination a yoke member formed of a center plate and two side plates, the latter having portions extending below the center plate to form spaced-apart arms, said yoke member being adapted to be fixed to a trailer and the center plate thereof have its lowermost face beveled; a brake operating lever pivotally mounted between the aforesaid arms formed by said side plates; and a tow bar pivotally connected to the forward end of said brake operating lever whereby a pull on the tow bar forwardly of the trailer effects a rotation of said brake operating lever in a direction away from said beveled face, and a push of the tow bar towards the trailer effects a rotation of said brake operating lever in the opposite direction and into engagement with said beveled face to apply the trailer brakes.

CHALMERS S. CORZINE.